(12) United States Patent
Kimura et al.

(10) Patent No.: US 12,537,031 B1
(45) Date of Patent: Jan. 27, 2026

(54) MAGNETIC RECORDING DEVICE AND METHOD OF MANUFACTURING THE SAME

(71) Applicants: Kabushiki Kaisha Toshiba, Tokyo (JP); Toshiba Electronic Devices & Storage Corporation, Tokyo (JP)

(72) Inventors: Kaori Kimura, Yokohama Kanagawa (JP); Takao Furuhashi, Kawasaki Kanagawa (JP); Masaya Ohtake, Fujisawa Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/057,804

(22) Filed: Feb. 19, 2025

(30) Foreign Application Priority Data

Oct. 23, 2024 (JP) ................. 2024-186638

(51) Int. Cl.
*G11B 33/14* (2006.01)
*G11B 5/00* (2006.01)

(52) U.S. Cl.
CPC .. *G11B 33/1453* (2013.01); *G11B 2005/0021* (2013.01)

(58) Field of Classification Search
CPC ................ G11B 33/1453; G11B 2005/0021
See application file for complete search history.

(56) References Cited

U.S. PATENT DOCUMENTS

| | | | |
|---|---|---|---|
| 5,388,015 A * | 2/1995 | Schandl | G11B 33/1453 360/137 |
| 6,409,380 B1 * | 6/2002 | Fukuzono | G11B 33/1453 |
| 7,119,978 B2 | 10/2006 | Victor et al. | |
| 9,852,758 B1 * | 12/2017 | McIntosh | G11B 23/021 |
| 10,468,071 B1 | 11/2019 | Tasaka et al. | |
| 10,734,035 B1 | 8/2020 | Sun et al. | |
| 10,957,347 B1 * | 3/2021 | Biskeborn | G11B 5/314 |
| 2005/0270679 A1 * | 12/2005 | Victor | G11B 33/1453 |
| 2020/0365183 A1 | 11/2020 | Matsumoto | |
| 2021/0090605 A1 | 3/2021 | Suzuki et al. | |
| 2021/0201941 A1 | 7/2021 | Hyodo | |
| 2021/0256996 A1 | 8/2021 | Ohtake et al. | |
| 2021/0287701 A1 | 9/2021 | Kudo | |
| 2022/0051693 A1 | 2/2022 | Hyodo | |
| 2023/0063493 A1 | 3/2023 | Matsumoto et al. | |
| 2024/0096349 A1 | 3/2024 | Isokawa et al. | |
| 2024/0321293 A1 | 9/2024 | Matsumoto et al. | |
| 2024/0321312 A1 | 9/2024 | Kimura et al. | |

FOREIGN PATENT DOCUMENTS

| | | |
|---|---|---|
| JP | 2020-187815 A | 11/2020 |
| JP | 2021-47951 A | 3/2021 |
| JP | 2021-106063 A | 7/2021 |
| JP | 2021-131918 A | 9/2021 |

(Continued)

*Primary Examiner* — Andrew Sasinowski
(74) *Attorney, Agent, or Firm* — Kim & Stewart LLP

(57) ABSTRACT

According to one embodiment, a magnetic recording device includes a housing having an internal dew point of 5° C. or less, a disk-shaped recording medium provided inside the housing, and a magnetic head provided inside the housing and performing information processing with respect to the recording medium.

12 Claims, 8 Drawing Sheets

(56) References Cited

FOREIGN PATENT DOCUMENTS

| JP | 2021-149978 A | 9/2021 |
| JP | 2022-32269 A | 2/2022 |
| JP | 2023-31619 A | 3/2023 |
| JP | 2024-44496 A | 4/2024 |
| JP | 2024-134253 A | 10/2024 |
| JP | 2024-135927 A | 10/2024 |

* cited by examiner

MAGNETIC RECORDING DEVICE AND METHOD OF MANUFACTURING THE SAME

CROSS-REFERENCE TO RELATED APPLICATIONS

This application is based upon and claims the benefit of priority from Japanese Patent Application No. 2024-186638, filed Oct. 23, 2024, the entire contents of which are incorporated herein by reference.

FIELD

Embodiments described herein relate generally to a magnetic recording device and a method of manufacturing the magnetic recording device.

BACKGROUND

As a magnetic recording device, such a type that uses a magnetic head of the heat-assisted magnetic recording (HAMR) mode has been proposed. The HAMR is a technology that increases the recording capacity by heating the recording medium to a temperature of the Curie temperature (Tc) or higher using a heating source such as a laser during recording.

In heat-assisted magnetic recording, high-temperature regions are created in the head and recording medium even if only locally. Under these circumstances, the environment within the magnetic recording device affects the degradation modes of the head and recording medium. For example, moisture contained within the magnetic recording device can be a factor of various degradation modes, such as causing corrosion of the head in a high-temperature state, decomposing the lubricant of the recording medium to generate acid and the like.

DETAILED DESCRIPTION

Various embodiments will be described hereinafter with reference to the accompanying drawings. In general, according to one embodiment, a magnetic recording device comprises a housing having an internal dew point of 5° C. or less, a disk-shaped recording medium provided inside the housing, and a magnetic head provided inside the housing and performing information processing with respect to the recording medium.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

As a magnetic recording device, a hard disk drive (HDD) according to the first embodiment will be described in detail.

Figure 1:
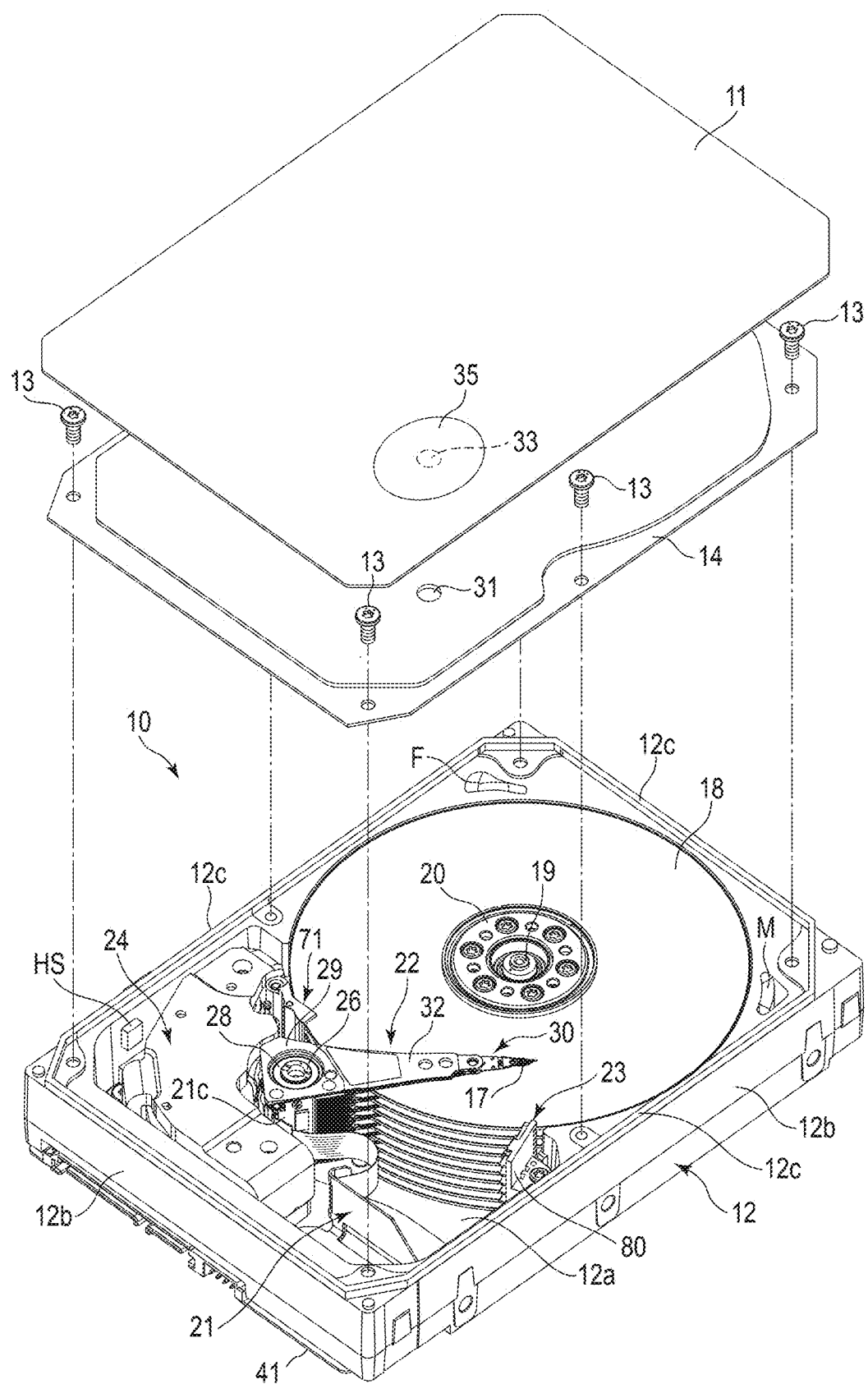
FIG. 1 is an exploded perspective view of a hard disk drive (HDD) according to the first embodiment, showing a top cover thereof removed.

FIG. 1 is an exploded perspective view of the HDD of the first embodiment, with its cover removed.

As shown in FIG. 1, the HDD comprises a substantially rectangular-shaped housing 10. The housing 10 includes a rectangular box-shaped base 12 with an upper surface opened, an inner cover 14 to be screwed to the base 12 by multiple screws 13 to close the upper opening of the base 12, and an outer cover (top cover) 11 placed to be overlaid on the inner cover 14 including a peripheral edge portion welded to the base 12. The base 12 includes a rectangular-shaped bottom wall 12a opposing the inner cover 14 with a gap therebetween, and side walls 12b formed to stand along the circumference of the bottom wall 12a, which are formed into one body from an aluminum alloy, for example. The side walls 12b include a pair of long side walls that oppose each other and a pair of short side walls that oppose each other. On upper end surfaces of the side walls 12b, a substantially rectangular-frame-shaped fixed rib 12c is provided to protrude therefrom.

The inner cover 14 is formed into a rectangular plate shape from stainless steel, for example. The inner cover 14 is screwed by its peripheral edge portion to the upper surfaces of the side walls 12b with screws 13, and is fixed to an inner side the fixed rib 12c. The outer cover 11 is formed into a rectangular plate shape from aluminum, for example. The outer cover 11 is formed to have flat dimensions slightly larger than those of the inner cover 14. The outer cover 11 is welded by its peripheral edge portion over an entire circumference to the fixed rib 12c of the base 12, and is airtightly fixed to the base 12.

The inner cover 14 and the outer cover 11 have ventilation holes 31 and 33, respectively, that allow the inside and outside of the housing 10 to communicate each other. The air inside the housing 10 is exhausted via the ventilation holes 31 and 33, and a low-density gas (inert gas) having a density lower than that of the air, for example, helium (He), is sealed inside the housing 10 via these ventilation holes 31 and 33. Onto the outer surface of the outer cover 11, for example, a seal (sealing body) 35 is attached to close the ventilation hole 33.

In this embodiment, the low-density gas contains, for example, oxygen at a ratio of about 5%. The oxygen ratio (oxygen concentration) should preferably be set to a range of 1% or more and less than 20%.

Inside the housing 10, a plurality of, for example, ten magnetic disks 18, as disk-shaped recording media, and a spindle motor (SPM) 19 as a drive motor to support and rotate the magnetic disks 18 are provided. The spindle motor 19 is provided on the bottom wall 12a. Each magnetic disk 18 is formed into a shape of a round disk, for example, with a diameter of 96 mm (3.5 inches). Each magnetic disk 18 comprises a substrate made of a non-magnetic material, for example, glass or aluminum, and a magnetic recording layer formed on each of an upper surface and a lower surface of the substrate.

The magnetic disks 18 are fitted coaxially to a hub of the spindle motor 19, which will be described later, and are further clamped by clamp springs 20, respectively. The multiple magnetic disks 18 are rotated at a predetermined speed by the spindle motor 19. Note that the number of magnetic disks 18 mounted is not limited to ten, but may be nine or less, or eleven or more.

Within the housing 10, a plurality of magnetic heads 17 which carry out recording and reproduction of information with respect to the magnetic disks 18, respectively, and an actuator assembly 22 which supports the magnetic heads 17 so as to be freely movable relative to the respective magnetic disks 18. Further, inside the housing 10, a voice coil motor (VCM) 24 which pivots and positions the actuator assembly 22, a ramp load mechanism 23 which holds the respective magnetic head 17 at an unloaded position remote from the respective magnetic disk 18 when the magnetic head 17 is moved to the outermost circumference of the magnetic disk 18, a substrate unit (FPC unit) 21 on which electronic components such as conversion connectors are mounted, a spoiler 71, and a circulation filter F. Note that the ramp load mechanism 23 includes a ramp 80.

A humidity sensor HS which can detect the relative humidity inside the housing 10 is provided in the housing 10. Note that the relative humidity inside the housing 10 is adjusted to 3% or less.

Further, inside the housing 10, a moisture absorbent (desiccant) M with excellent moisture absorbency, such as zeolite, calcium oxide, or silica gel, is disposed. By adjusting the amount of the moisture absorbent M, the dew point inside the housing 10 is set to 5° C. or less.

In more detail, at least in a temperature range of 25 to 40° C., the inside of the housing 10 is set to a temperature below the ambient temperature and a dew point of 5° C. or less. It is preferable that at least in a temperature range of −5 to 60° C., the dew point inside the housing 10 is set to a temperature below or equal to the ambient temperature and 5° C. or less.

A printed circuit board 41 is screwed to the outer surface of the bottom wall 12a of the base 12. The printed circuit board 41 is configured as a control unit which controls the operation of the spindle motor 19, the operation of the VCM 24, and the operation of the magnetic heads 17.

As shown in FIG. 1, the actuator assembly (,which may as well be referred to as a head stack assembly (HSA)) 22 comprises an actuator block 29 having a through hole 26, a bearing unit 28 provided in the through hole 26, a plurality of, for example, eleven arms 32, suspension assemblies (, which may as well be referred to as head gimbal assemblies (HGAs)) 30 attached to the arms 32, respectively and magnetic heads 17 supported respectively by the suspension assemblies 30. On the bottom wall 12a of the base 12, a support shaft (pivot shaft) not shown in the figure is provided to stand. The actuator block 29 is supported by the bearing unit 28 to be rotatable around the support shaft.

The actuator assembly 22 includes a support frame, which is not shown in the figure, and extends from the actuator block 29 in a direction opposite to the arms 32, and the voice coil which constitutes a part of the VCM 24 is supported by the support frame.

Figure 2:
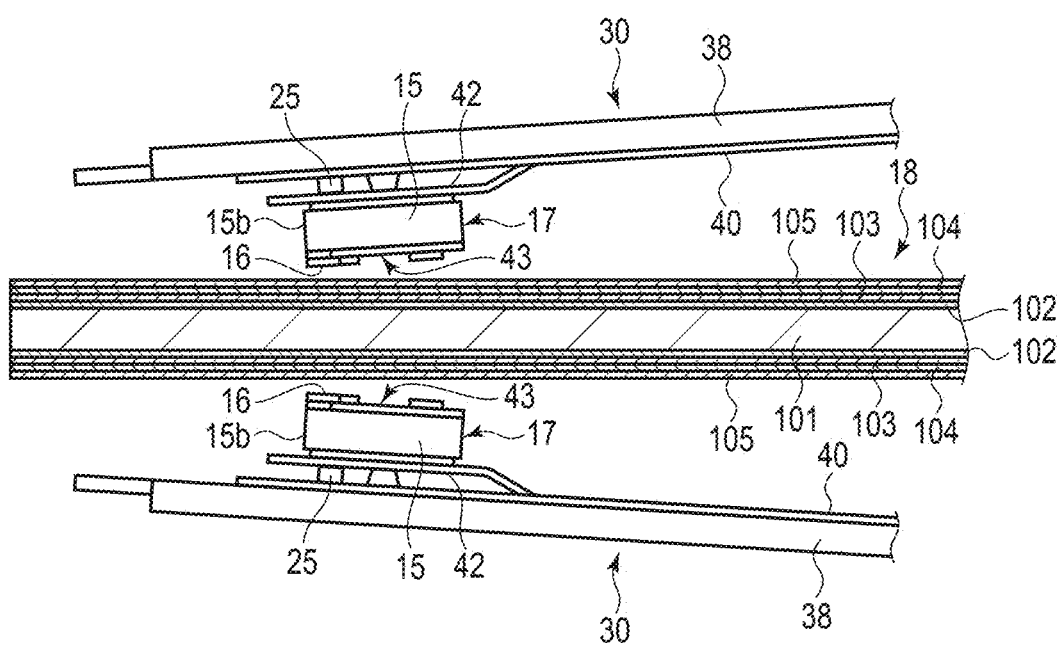
FIG. 2 is a side view schematically showing a distal end portion of a suspension assembly and a magnetic head in the HDD.

FIG. 2 is a side view schematically showing the distal end portion of the suspension assembly 30 and the magnetic head 17.

As shown in FIG. 2, the suspension assembly 30 includes a base plate, which is not shown, attached to each of the arms 32, a slender plate-spring-shaped load beam 38 extending from the base plate, and a slender strip-shaped flexure (wiring member) 40. The flexure 40 has a displaceable gimbal portion 42, and the magnetic head 17 is mounted on the gimbal portion 42.

The magnetic head 17 is configured as a flying type head and includes a slider 15 having substantially a rectangular parallelopiped shape and a head portion 16 formed at an end portion of the slider 15. The head portion 16 is formed from a plurality of layers of thin films. The slider 15 has a substantially rectangular-shaped disk opposing surface (air bearing surface (ABS)) 43 which opposes a surface of the respective magnetic disk 18, and a rear surface attached to the gimbal portion 42. On the rear surface of the slider 15, a laser oscillator which functions as a light source, such as a laser diode unit (LDU) 25 is fixated. The slider 15 is maintained in a state where it is allowed to fly a predetermined amount above the surface of the magnetic disk 18 by the air flow generated between the disk surface and the ABS 43 by the rotation of the magnetic disk 18.

Figure 4:
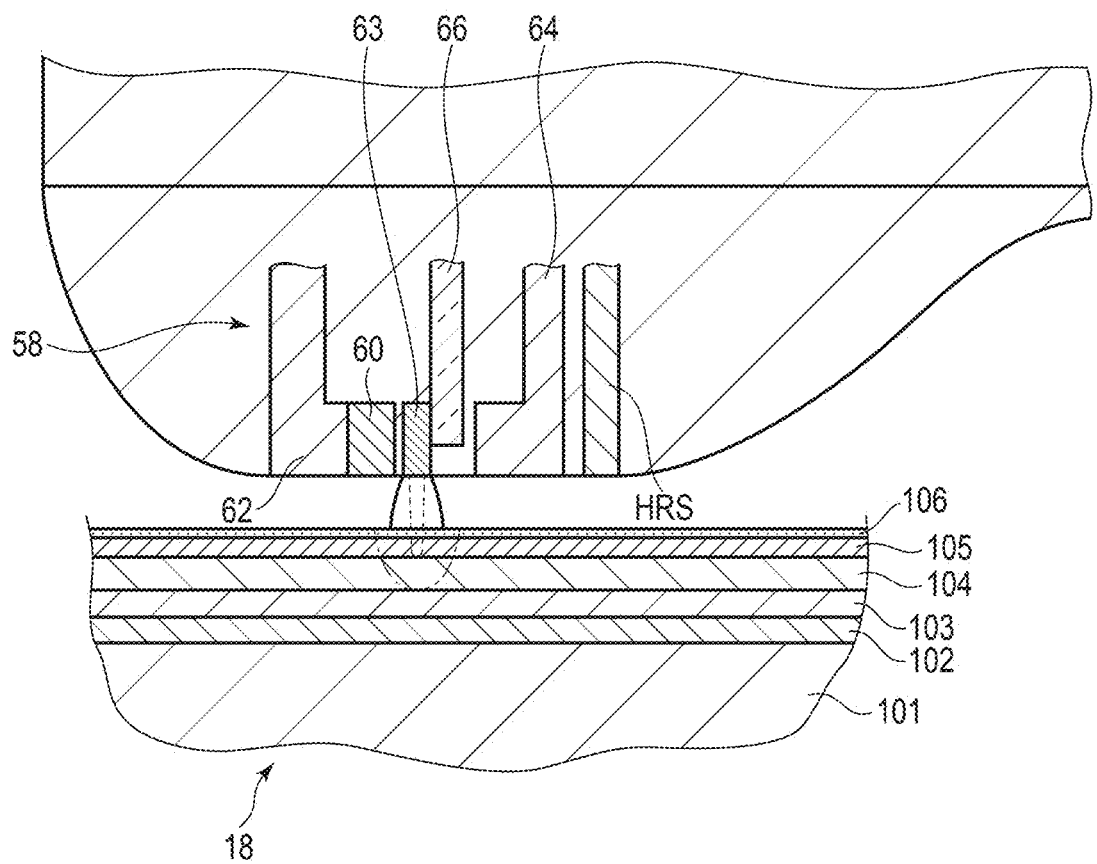
FIG. 4 is an enlarged cross-sectional view showing a recording head and heat-assisted element of the magnetic head.

As shown in FIG. 2, the magnetic disk 18 includes a substrate 101 made of a non-magnetic material formed into the shape of a disk. On each of the upper and lower surfaces of the substrate 101, a heat sink layer 102, a crystal orientation layer 103, a magnetic recording layer 104 having magnetic anisotropy in a direction perpendicular to the surface of the respective magnetic disk 18, and a protective layer 105 with a surface coated by a lubricant 106 (see FIG. 4) are stacked successively in order. The crystal orientation layer 103 is provided to improve the orientation of the magnetic recording layer 104. The heat sink layer 102 is disposed below the crystal orientation layer 103 so as to suppress the expansion of the heating area.

Figure 3:
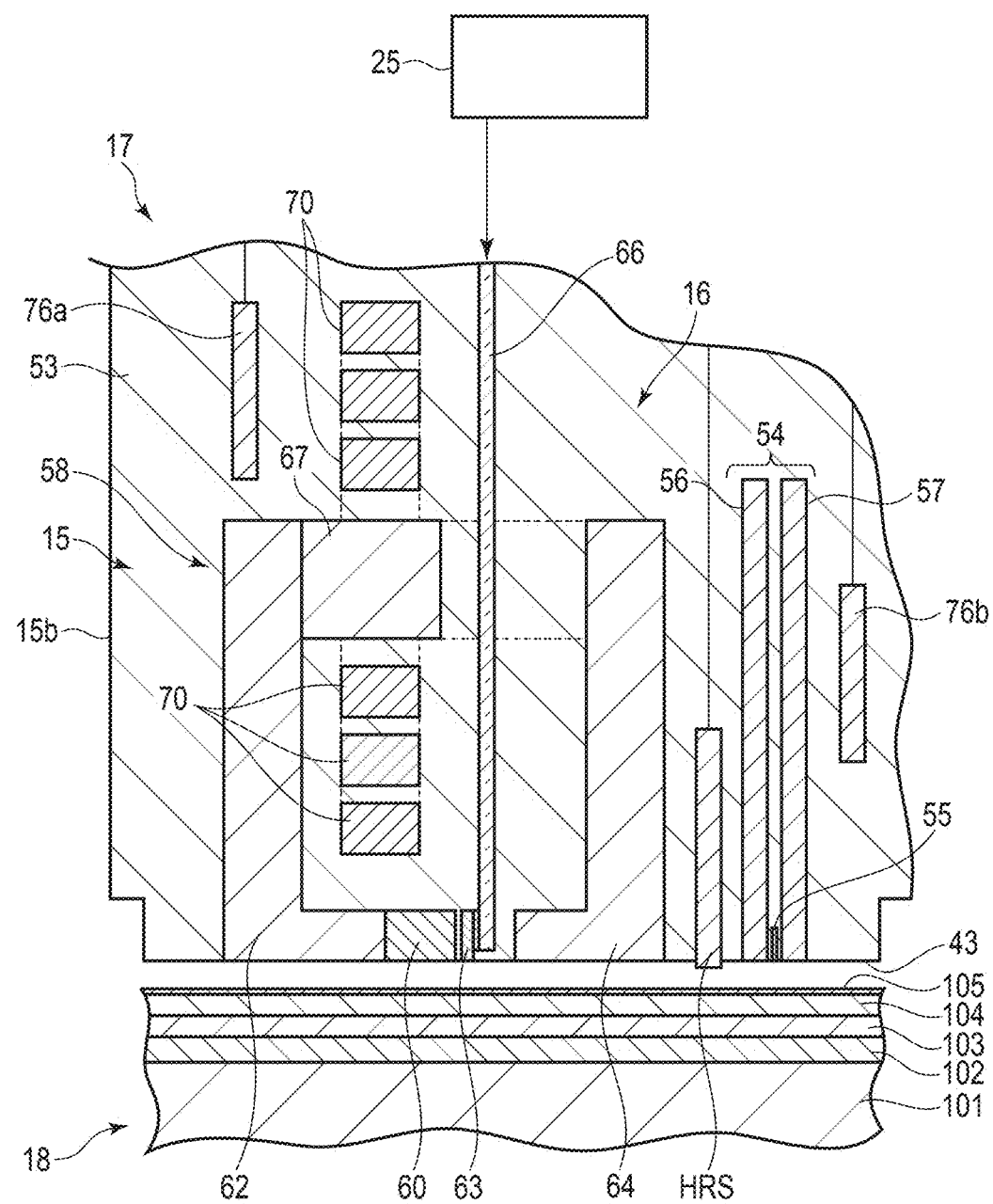
FIG. 3 is an enlarged cross-sectional view showing a head portion of the magnetic head.

FIG. 3 is an enlarged cross-sectional view showing the head portion 16 of the magnetic head 17 and the magnetic disk 18.

As shown in FIG. 3, the head portion 16 includes a read head (, which may be referred to as a reproduction element) 54 and a write head (, which may be referred to as a recording element) 58, which are formed on a trailing end 15b of the slider 15 by a thin film process. The read head 54 and write head 58 are covered by a non-magnetic protective insulating film 53 except for the portions exposed to the ABS 43 of the slider 15. The protective insulating film 53 forms the outer shape of the head portion 16.

The magnetic head 17 is configured as a magnetic head of the heat-assisted magnetic recording mode. That is, the magnetic head 17 includes a heat-assisted element that heats the respective magnetic disk 18 as an assisting element which assists magnetic recording. In one example, the thermal assisted element of the magnetic head 17 contains an LDU 25 mounted on the slider 15, a light emitting element which irradiates laser light onto the surface of the magnetic disk, that is, in this case, a near-field light generation element 63, and a waveguide 66 which propagates the laser light oscillated by the LDU 25 to the near-field light generation element 63. Further, the magnetic head 17 includes a heat resistance sensor HRS which detects the surface condition (the defect condition) of the surface of the magnetic disk, a first thermal actuator which controls the protrusion amount of the write head 58, and a second thermal actuator which controls the protrusion amount of the read head 54.

The read head 54 includes a magnetic film 55 which exhibits a magnetoresistive effect, and shield films 56 and 57 which are disposed on the trailing side and leading side of the magnetic film 55 so as to interpose the magnetic film 55 therebetween. The magnetic film 55 and the shield films 56 and 57 extend to be substantially perpendicular to the ABS 43. Lower ends of the magnetic film 55 and the shielding films 56 and 57 are exposed to the ABS 43 of the slider 15.

The write head 58 is provided on the trailing end 15*b* of the slider 15 with respect to the read head 54. The write head 58 includes a main pole 60 which generates a recording magnetic field in a direction perpendicular to the surface of the magnetic disk 18, a trailing shield 62 made of a soft magnetic material which is joined to the trailing side of the main pole 60 and allows magnetic flux to flow to the main pole 60, a return shield pole 64 made of a soft magnetic material which is arranged to oppose the main pole 60 with a write gap therebetween on the leading side of the main pole 60, a joint point 67 which physically joins an upper portion of the trailing shield 62 to the return shield pole 64, and a recording coil 70 which is arranged to wind around a magnetic path including the trailing shield 62 and the return shield pole 64 in order to flow magnetic flux to the main pole 60.

The main pole 60 is formed of a soft magnetic material having high magnetic permeability and high saturation magnetic flux density, and extends substantially perpendicular to the ABS 43. The main pole 60 has a leading end surface which is exposed to the ABS 43 and a pole end surface which extends upward from the ABS 43, that is, in a direction away from the ABS 43 and opposes the near-field light generation element 63.

The near-field light generation element (plasmon generator or near-field transducer) 65 is provided between the main pole 60 and the return shield pole 64, so as to oppose the pole end surface of the main pole 60 in parallel with a gap (gap length) therebetween. An end of the near-field light generation element 63 on an ABS 43 side is formed parallel to and flush with the ABS 43.

It is preferable that the near-field light generation element 63 be formed of Au, Pd, Pt, Rh, or Ir, or an alloy of any combination of these. Between the main pole 60 and the near-field light generation element 63, an insulating layer is interposed and the insulating layer should preferably be of an oxide of $SiO_2$, $Al_2O_3$, or the like.

The waveguide 66 extends from the ABS 43 to the rear surface of the slider 15, that is, the end surface on a suspension side, and is optically connected to the LDU 25. The end portion (extending end portion) of the waveguide 66 on the ABS 43 side is located to oppose the near-field light generation element 63 in substantially parallel with a gap therebetween. Between the waveguide 66 and the near-field light generation element 63, an insulating layer is interposed.

As described above, the distal end surface of the main pole 60, the distal end surface of the trailing shield 62, the distal end of the near-field light generation element 63, and the distal end surface of the return shield pole 64 are exposed to the ABS 43 of the slider 15 and are covered by a protective layer not shown in the figure.

The first thermal actuator includes, for example, a heater 76*a* as a heating element. The heater 76*a* is embedded in the protective insulating film 53 and is located near the write head 58. The second thermal actuator includes, for example, a heater 76*b* as a heating element. The heater 76*b* is embedded in the protective insulating film 53 and is located near the read head 54.

The heat resistance sensor HRS is embedded in the protective insulation film 53 and is located between the write head 58 and the read head 54. The detecting end (distal end portion) of the heat resistance sensor HRS is exposed to the ABS 43 or slightly protrudes from the ABS 43. Note that the heat resistance sensor HRS is used as an example of a head-disk interface (HDI) sensor.

Figure 5:
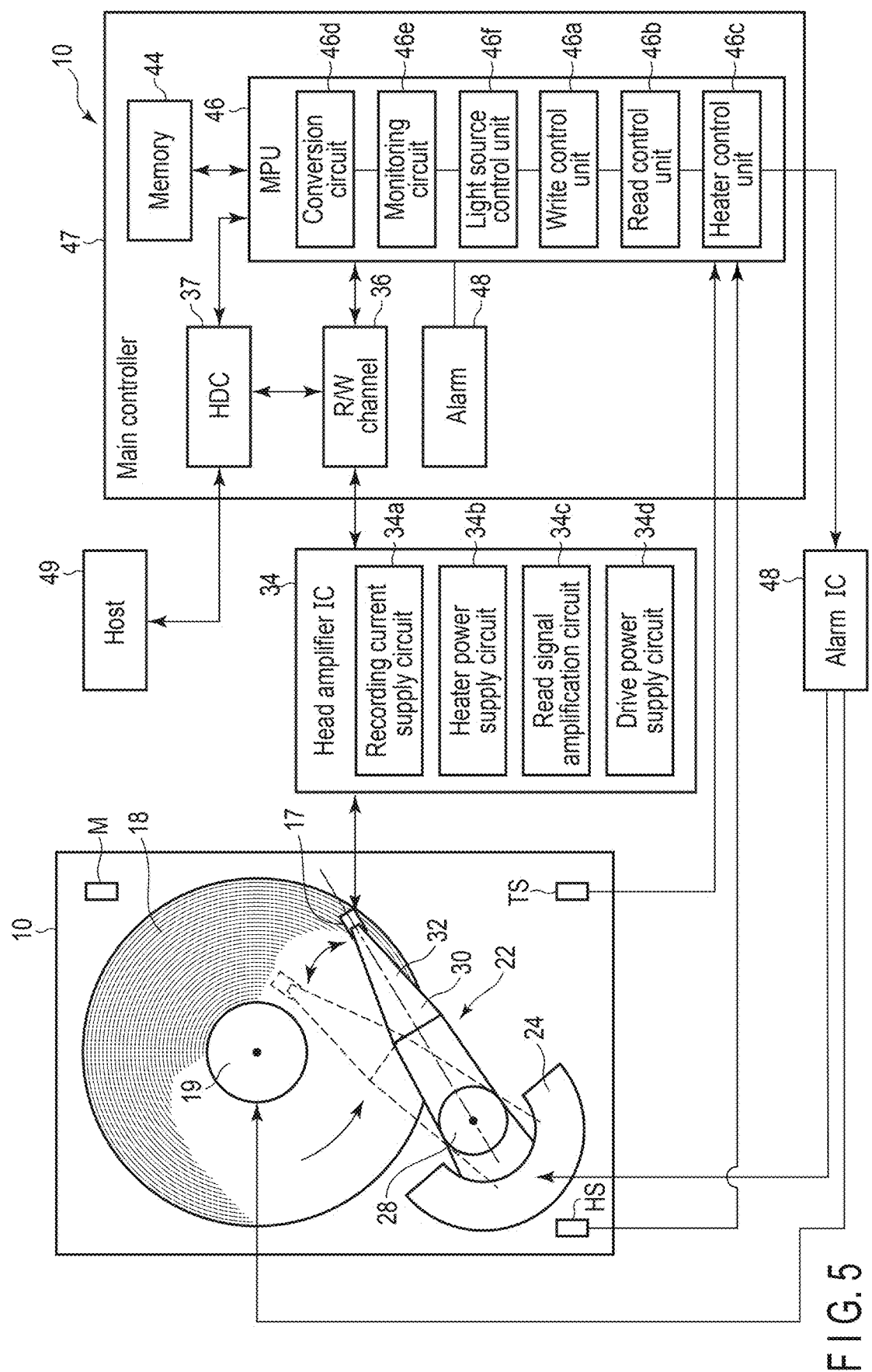
FIG. 5 is a block diagram schematically showing an overall configuration of the HDD.

FIG. 5 is a block diagram schematically showing an overall configuration of the HDD, including the control system.

As shown in FIG. 5, the magnetic disks 18, the actuator assembly 22, the magnetic heads 17, and the VCM 24 are disposed in the housing 10. Further, in the housing 10, a moisture absorbent M, a humidity sensor HS, and a temperature sensor TS are provided.

The HDD comprises a controller that includes a head amplifier IC 34 that drives the magnetic heads 17, a main controller 47, and a driver IC 51. The head amplifier IC 34 is provided in the actuator assembly 22, for example, and is electrically connected to the magnetic heads 17 via the FPC and a flexure 40. In one example, the head amplifier IC 34 includes a recording current supply circuit (recording current supply unit) 34*a* which supplies a recording current to the recording coil 70 of the respective magnetic head 17, a heater power supply circuit 34*b* which supplies drive power to the thermal actuators (the first heater 76*a* and the second heater 76*b*) of the respective magnetic head 17, a sensor output amplification circuit (not shown) which amplifies a detection signal of the heat resistance sensor HRS, a read signal amplification circuit 34*c* which amplifies a signal read by the respective magnetic head 17, a drive power supply circuit 34*d* which supplies drive power to a light source, that is, for example, the laser diode unit (LDU) 25, and the like.

The main controller 47 and the driver IC 51 are configured on the control circuit board 41 provided, for example, on a rear surface side of the housing 10. The main controller 47 comprises a read/write channel (R/W channel) 36, a hard disk controller (HDC) 37, a microprocessor (MPU) 46, a memory 44 and the like. The main controller 47 is electrically connected to the magnetic heads 17 via the head amplifier IC 34. The main controller 47 is electrically connected to the VCM 24 and spindle motor 19 via the driver IC 51. The HDC 37 can be connected to a host computer 49.

In the main controller 47, the MPU 46 includes a write control unit 46*a* which controls the respective write head, a read control unit 46*b* which controls the respective read head, a heater control unit 46*c* which controls the power supplied to the thermal actuator, a conversion circuit 46*d*, a monitoring circuit 46*e*, a light source control unit 46*f* which controls the drive of the light source, and the like.

The main controller 47 includes an alarm 48. The alarm 48 is connected to the monitoring circuit 46*e*. Further, the temperature sensor TS and the humidity sensor HS are electrically connected to the main controller 47. The temperature sensor TS and the humidity sensor HS each input the detection signal to the MPU 46.

The conversion circuit 46*d* converts the relative humidity RH inside the housing 10 detected by the humidity sensor HS into a dew point according to the temperature inside the housing 10 detected by the temperature sensor TS, and sends the converted dew point to the monitoring circuit 46e. An example of its conversion formula will be provided.

The saturated vapor pressure $e_W$ at a given temperature T can be obtained by Sonntag's formula as follows:

$$\ln(e_W) = -6096.9385 \times T^{-1} + 21.2409642 - 2.711193 \times 10^{-2} \times T + 1.673952 \times 10^{-5} \times T^2 + 2.433502 \times \ln(T)$$

The vapor pressure e is calculated from the relative humidity RH of the device, and the temperature at which this value is equal to $e_W$ is taken as the dew point. Specifically, when $y = \ln(e/611.213)$, the dew point td [° C.] can be obtained by: $(=) 13.7204 \times y + 7.36631 \times 10^{-1} \times y^2 + 3.32136 \times 10^{-2} \times y^3 + 7.78591 \times 10^{-4} \times y^4$ The monitoring circuit 46e monitors the dew point sent from the conversion circuit 46d and monitors whether or not it has exceeded the predetermined dew point (for example, 5° C.). When it has exceeded the predetermined dew point, the monitoring circuit 46e outputs a drive signal to the alarm 48. The alarm 48 outputs an alarm, for example, an alarm sound or alarm light, in response to the drive signal.

When the drive signal is output from the monitoring circuit 46e, the light source control unit 46f, which is the control unit for the assist element, controls the drive power supply circuit 34d to reduce the assist current supplied to the assist element, in this case, the drive current supplied to the LDU 25.

According to the HDD having the above-described configuration, in the writing of information, the main pole 60 is excited by the recording coil 70, and a recording magnetic field in the vertical direction is applied to the magnetic recording layer 104 of the magnetic disk 18 directly below from the main pole 60, and thus the information is recorded in the magnetic recording layer 104 by a desired track width. Further, in the heat-assisted magnetic recording, when writing information, laser light is supplied from the LDU 25 to the near-field light generation element 63 via the waveguide 66, and near-field light is generated from the near-field light generation element 63. The magnetic recording layer 104 of the magnetic disk 18 is locally heated by the near-field light generated by the near-field light generation element 63, and thus the coercivity of the recording area is reduced. To this area where the coercivity is reduced, a recording magnetic field from the main pole 60 is applied and a recording signal is written. In this way, the magnetic recording layer 104 is locally heated and the signal is written in the area where the coercivity is sufficiently reduced, and thus it becomes possible to perform high-density recording.

On the other hand, when a magnetic disk is locally heated by near-field light, the protective film of the magnetic head may be deteriorated, or the lubricant of the magnetic disk may be thermally decomposed, which may cause a chemical reaction with the material of the light emitting element. In this case, it is considered that corrosion of the magnetic head and deformation of the light emitting element may occur due to moisture inside the housing. Therefore, it is desirable to control the amount of moisture in a gaseous form inside the housing to a level where the above-described corrosion or deformation does not occur.

Further, when the amount of moisture is defined by relative humidity, it should be noted that the amount of moisture inside the housing differs between high and low temperature states, even at the same relative humidity. Specifically, the actual amount of moisture in the atmosphere is higher in high temperature states, and reactions caused by moisture are accelerated.

Under these circumstances, the HDD of this embodiment is configured such that the relative humidity is defined by the dew point, which is the absolute amount of moisture, and the amount of moisture inside the device is kept at the desired value or lower even in a wide temperature range. That is, as described above, according to this embodiment, the amount of moisture inside the housing 10 is defined by the dew point, and the dew point of the inside of the housing is set to 5° C. or less.

Figure 6:
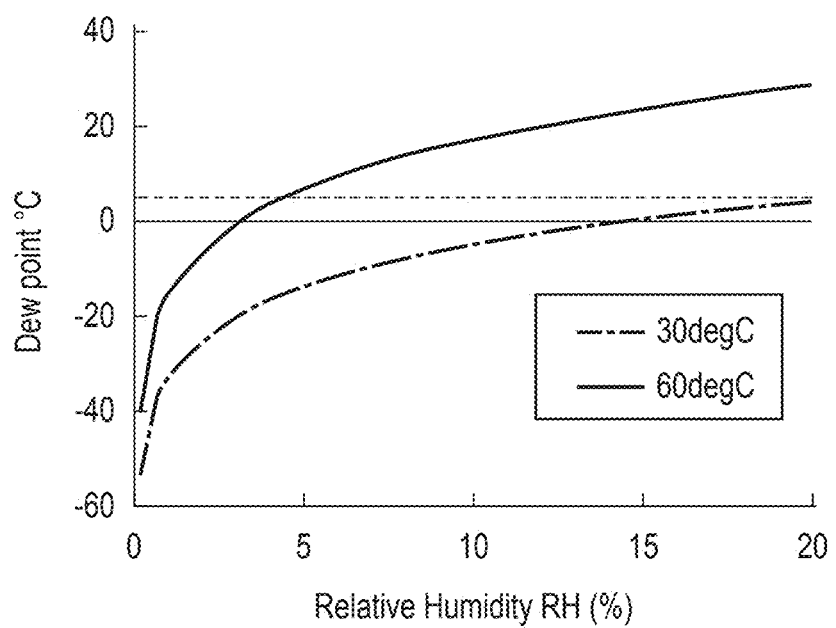
FIG. 6 is a diagram showing the relationship between relative humidity and dew point in the HDD.

FIG. 6 shows the relationship between the relative humidity (RH) corresponding to the amount of moisture and the dew point as to the states where the environmental temperature (temperatures inside the housing) is at 30° C. and 60° C., respectively.

The corrosion state of the magnetic head and the deformation state of the optical element were examined under temperature conditions of 25° C. to 60° C. and moisture conditions of 0.2% to 10% RH. From the results, it was found that corrosion of the magnetic head and deformation of the optical element can be suppressed by setting the temperature inside the housing 10 to the ambient temperature or below and the dew point to 5° C. or below, at least in the temperature range of −5 to 60° C., and preferably in the temperature range of at least 25 to 40° C.

As described above, the dew point inside the housing 10 can be set to the desired value by adjusting, for example, the amount and type of the moisture absorbent M installed inside the housing 10.

In one example, the amount of the moisture absorbent M installed is set to about 0.5 to 8% of the volume inside the housing 10.

As an example, with an HDD of 3.5-inch standard, the amount of the moisture absorbent (zeolite) M was varied to examine the change in the dew point. The results indicated that, by setting the amount of moisture absorbent M to 0.1 to 5 g, the dew point inside the housing 10 could be kept at 5° C. or lower.

As described above, according to the HDD of the first embodiment, the amount of moisture inside the device (HDD) is defined in terms of the dew point, and the dew point inside the device to set to 5° C. or less. With this configuration, the absolute amount of moisture inside the device can be kept at a level that does not cause deterioration of the magnetic head or recording medium, or at a level that causes only minor deterioration, if any. Thus, the performance of the magnetic recording device can be kept constant within a specified period of time.

Further, the dew point inside the device is monitored by the controller 47, and if the dew point exceeds the specified dew point, the alarm 48 can be used to issue a warning. With this configuration, the operator can take appropriate action in response to the alarm.

Furthermore, the controller is configured to reduce the drive power of the assist element when the dew point inside the device exceeds a specified dew point. With this configuration, it is possible to suppress the degradation of the magnetic head and recording medium, which may be caused by moisture inside the device.

As described above, according to the first embodiment, it is possible to provide a magnetic recording device that can suppress the deterioration of the heads and recording media and maintain its performance at a constant level over a specified period of time.

Next, an example of a method of manufacturing an HDD having the above-described configuration will be explained.

In the method of manufacturing the HDD, some or all of the manufacturing process up to the welding are performed in a constant temperature oven in an extremely low-humidity environment of a dew point of 0° C. or lower, for example.

First, the base 12, inner cover 14, and outer cover 11 of the housing 10 are prepared. Next, the spindle motor 19, magnetic disks 18, and ramp 80 are installed on the base 12. Further, the actuator assembly 22, which includes the magnetic heads 17, and the VCM 24 are installed on the base 12.

In advance, the amount of moisture absorbent necessary to keep the inside of the housing 10 at a dew point of 5° C. or less is set, and the set amount of moisture absorbent M is prepared. Then, the prepared moisture absorbent M is placed inside the base 12.

Next, the inner cover 14 is screwed to the base 12 to close the upper opening of the base 12. Further, the outer cover 11 is placed to be overlaid on the inner cover 14, and the outer cover 11 is welded to the base 12 by its entire circumference of the peripheral edge portion. In this manner, the outer cover 11 is air-tightly fixated to the base 12.

Next, after the air inside the housing 10 is exhausted via the ventilation holes 31 and 33 of the inner cover 14 and outer cover 11, a low-density gas (inert gas) having a density lower than that of air, such as helium (He), is sealed inside the housing 10 via the ventilation holes 31 and 33. The low-density gas contains, for example, oxygen at a ratio of about 5%. The oxygen ratio (oxygen concentration) should preferably set to a range of 1% or more and less than 20%. After the gas is sealed in, the seal 35 is attached to the outer cover 11 to as to close the ventilation hole 33 and thus seal the ventilation hole 33.

Thereafter, the printed circuit board 41 is attached to the bottom surface of the base 12 and electrically connected to the actuator assembly 22 and the spindle motor 19.

By the above-described process, the HDD (magnetic recording device) is manufactured.

Next, magnetic heads of an HDD according to another embodiment will be explained. In the other embodiment described below, the parts identical to those of the first embodiment provided above will be designated by the same reference symbols, and the detailed descriptions thereof will be omitted or simplified, and the parts that differ from those of the first embodiment will be mainly explained.

Second Embodiment

Figure 7:
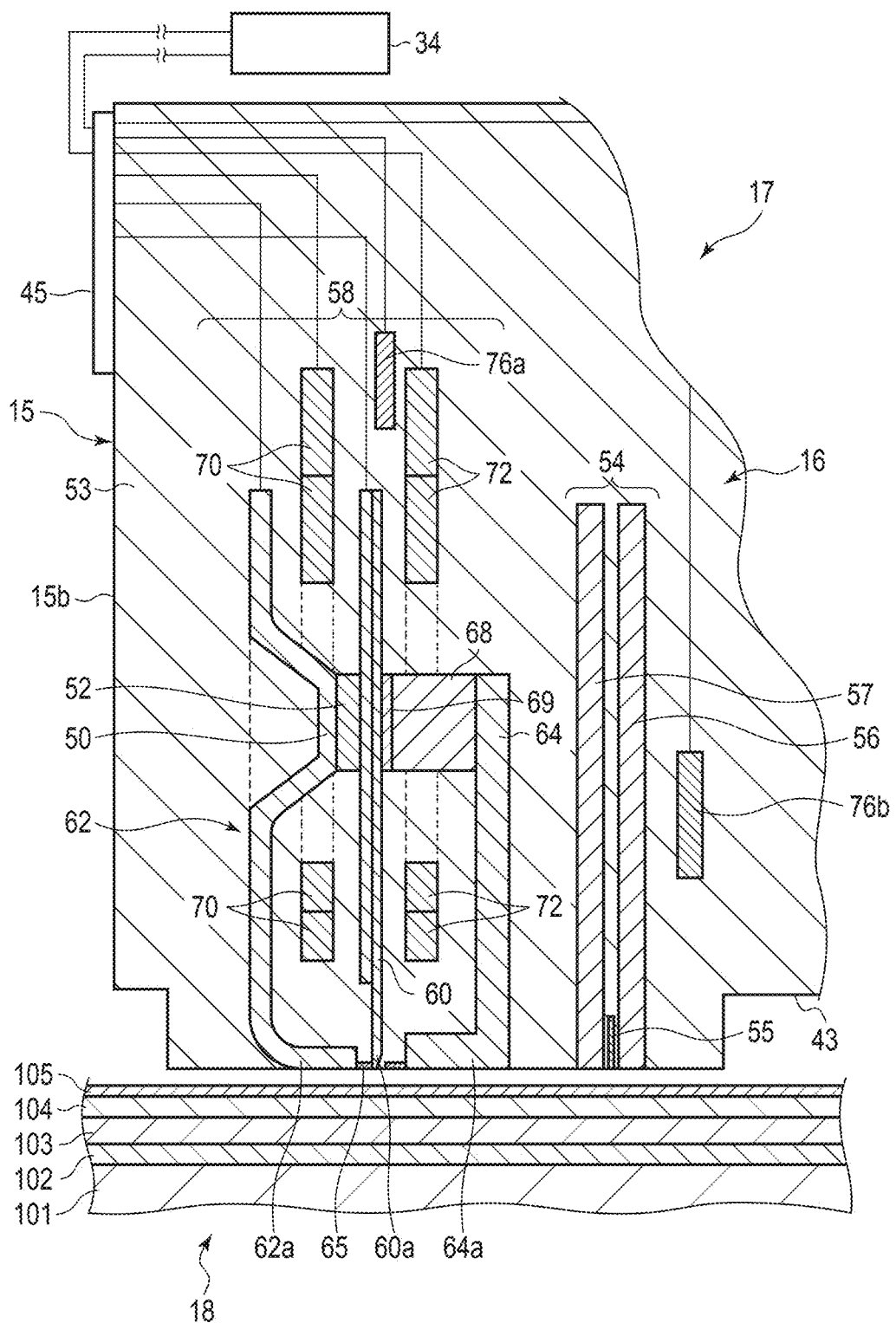
FIG. 7 is an enlarged cross-sectional view of a head portion of a magnetic head in an HDD according to the second embodiment.
Figure 8:
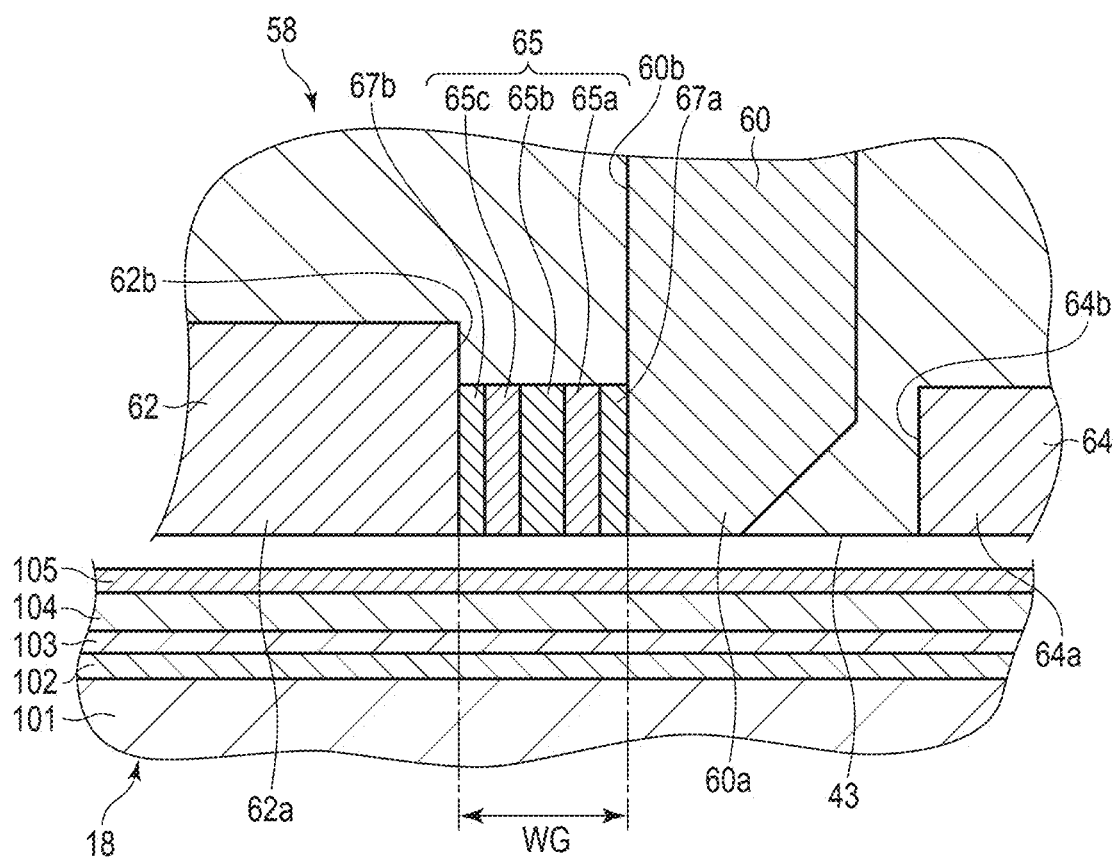
FIG. 8 is an enlarged cross-sectional view showing a magnetic head and a field-assisted element portion of the magnetic head.

FIG. 7 is an enlarged cross-sectional view showing a head portion of a magnetic head in the HDD of the second embodiment, and FIG. 8 is an enlarged cross-sectional view showing a recording head and a field-assisted element of the magnetic head.

In the HDD of the second embodiment, the magnetic head includes a field-assisted element as an assist element. In detail, as shown in FIG. 7, the head portion 16 of the magnetic head 17 include a read head 54 and a recording head 58, which are formed by a thin film process. The read head 54 and the recording head 58 are covered by a protective insulating film 53, except for the portions exposed to the ABS 43 of the slider 15. The head portion 16 may as well comprises a first heater 76a which heats the recording head 58 and a second heater 76b which heats the read head 54.

The recording head 58 includes a main pole 60 which generates a recording magnetic field perpendicular to the surface of the magnetic disk 18, a trailing shield (write shield pole) 62 provided to oppose the main pole 60 with a write gap WG therebetween, a return shield pole 64 provided to oppose the leading side of the main pole 60, a first recording coil 70 wound between the main pole 60 and the trailing shield 62, and a second recording coil 72 wound between the main pole 60 and the return shield pole 64.

The trailing shield 62 includes a first connection portion 50 connected to the main pole 60. The first connection portion 50 is magnetically connected to an upper portion of the main pole 60 via a non-conductor 52. The return shield pole 64 includes a second connection portion 68 that is joined to the main pole 60 at a position apart from the ABS 43. This second connection 68 is, for example, formed of a soft magnetic material and is magnetically connected to the upper portion of the main pole 60 via a non-conductor 59.

The recording head 58 comprises a high-frequency oscillator that functions as a field-assisted element, such as a spin torque oscillator (STO) 65.

As shown in FIG. 8, the STO 65 is provided between the main pole 60 and the trailing shield 62 within the write gap WG. In one example, the STO 65 includes a spin injection layer 65a, an intermediate layer (non-magnetic conductive layer) 65b, and an oscillation layer 65c, and it is formed by stacking these layers in order from the main pole 60 to the trailing shield 62. The spin injection layer 65a is joined to the main pole 60 via a non-magnetic conductive layer (underlying layer) 67a. The oscillation layer 65c is joined to the trailing shield 62 via a non-magnetic conductive layer (cap layer) 67b. Note that the stacking order of the spin injection layer 65a, the intermediate layer 65b, and the oscillation layer 65c may be reversed, that is, they may be stacked in the order from the trailing shield 62 to the main pole 60.

As shown in FIG. 7, the main pole 60 and the trailing shield 62 are connected to a connection terminal 45 via respective wiring lines, and are further connected to the head amplifier IC 34 and the main controller 47 via a flexure. A current circuit is configured that passes an STO drive current (bias voltage) in series from the head amplifier IC though to the main pole 60, the STO 65, and the trailing shield 62. The first recording coil 70, the second recording coil 72, the first heater 76a, and the second heater 76b are connected to the connection terminal 45 via respective wiring lines, and are further connected to the head amplifier IC 34 via the flexure 40.

Note that the HDD of the second embodiment comprises the head amplifier IC 34 and the main controller 47 shown in FIG. 5. Note here that when using the field-assisted element (STO 65), the drive power supply circuit 34d of the head amplifier IC 34 shown in FIG. 5 constitutes a drive power supply circuit which supplies the drive current to the STO 65. Further, the light source control unit 46f of the MPU 46 constitutes a drive control unit which controls the drive of the STO 65.

In the second embodiment, the other components of the HDD except for the magnetic heads, are identical to those of the HDD in the first embodiment. That is, as in the case of the first embodiment, the temperature inside the HDD of the second embodiment is set to the ambient temperature or less and a dew point of 5° C. or less at least in a temperature range of 25 to 40° C. Further, it is preferable that the dew point inside the housing should be at the ambient temperature or less and 5° C. or less at least in a temperature range of −5 to 60° C.

According to the HDD configured as described above, when writing information, the drive power supply circuit 34d of the head amplifier IC 34 applies a bias voltage to the main pole 60 and the trailing shield 62 under the control of the MPU 46, and thus a drive current is allowed to pass in series through the connection terminal 45, the wiring lines, the main pole 60, the STO 65, and the trailing shield 62. Thus, the drive current flows in a direction perpendicular to the stacked surface of the STO 65. In this way, the STO 65 oscillates spin torque and applies a high-frequency magnetic field to the magnetic recording layer 104 of the magnetic disk 18.

At the same time, the recording current supply circuit 34*a* of the head amplifier IC 34 passes the recording current to the first and second recording coils 70 and 72 in accordance with the recording signal and recording pattern generated by the R/W channel 36. The first and second recording coils 70 and 72 excite the main pole 60 to generate a recording magnetic field, which is applied to the magnetic recording layer 104 directly below from the main pole 60 in a perpendicular direction. With this configuration, information is recorded in the magnetic recording layer 104 by a desired track width. Note here that, by superimposing the high-frequency magnetic field of the STO 65 on the recording magnetic field, the magnetization inversion of the magnetic recording layer 104 is promoted, and magnetic recording with high magnetic anisotropy energy can be performed.

In the HDD of the second embodiment configured as described above, advantageous effect similar to those of the HDD of the first embodiment can be obtained. That is, the dew point inside the housing is set to 5° C. or less, and thus it is possible to provide a magnetic recording device which can suppress the deterioration of the head and recording medium and maintain a constant level of performance over a specified period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the assist element of the magnetic head is not limited to a heat assist element or a field-assisted element, and some other type of assist element may as well be used. Further, it is also possible to use a magnetic head that does not include an assist element. Moreover, the type of moisture absorbent is not limited to those listed in the embodiments described above, but naturally, other types of moisture absorbent may as well be selected.

What is claimed is:

1. A magnetic recording device comprising:
   a housing having an internal dew point of 5° C. or less;
   a disk-shaped recording medium provided inside the housing, and
   a magnetic head provided inside the housing, which performs information processing with respect to the recording medium.

2. The magnetic recording device of claim 1, wherein the internal dew point of the housing is less than or equal to an ambient temperature and 5° C. or less at least in a temperature range of −5 to 60° C.

3. The magnetic recording device of claim 1, further comprising:
   a moisture absorbent provided inside the housing.

4. The magnetic recording device of claim 1, wherein the magnetic head includes a heat-assisted element.

5. The magnetic recording device of claim 4, wherein the heat-assisted element includes a laser light source and an optical element which irradiates laser light onto the recording medium.

6. The magnetic recording device of claim 1, wherein the magnetic head includes a field-assisted element.

7. The magnetic recording device of claim 1, wherein the housing contains thereinside 1% or more and less than 20% of oxygen.

8. The magnetic recording device of claim 1, further comprising:
   a humidity sensor provided in the housing; and
   a controller including a conversion circuit which converts a relative humidity measured by the humidity sensor into a dew point.

9. The magnetic recording device of claim 8, wherein the controller further includes a monitoring circuit which monitors the dew point and an alarm which outputs an warning when the dew point exceeds 5° C.

10. The magnetic recording device of claim 9, wherein the magnetic head includes an assist element which assists magnetic recording, and
    the controller includes a drive power supply circuit which supplied drive current to the assist element and a drive control unit which reduces the drive current when the warning is output.

11. A method of manufacturing a magnetic recording device, the method comprising:
    preparing a moisture absorbent in an amount that maintains an internal dew point of a housing of the magnetic recording device at 5° C. or less; and
    installing, in a constant temperature oven of a low-humidity environment and a dew point of 0° C. or less, a spindle motor, a disk-shaped recording medium, an actuator assembly including a magnetic head, a voice coil motor, and the moisture absorbent on a base of the housing; and
    fixing a cover to the base to form the housing.

12. The method of claim 11, wherein
    a low-density gas having a density lower than that of air and an oxygen concentration of 1% or more and less than 20% is sealed inside the housing.

* * * * *